United States Patent [19]
Thomas

[11] Patent Number: 5,769,463
[45] Date of Patent: Jun. 23, 1998

[54] HEAT AND VIBRATION RESISTANT FLEXIBLE METAL HOSE ASSEMBLY

[75] Inventor: R. Winfield Thomas, West Lebanon, Ind.

[73] Assignee: Tru-Flex Metal Hose Corp., West Lebanon, Ind.

[21] Appl. No.: 675,933

[22] Filed: Jul. 5, 1996

[51] Int. Cl.⁶ .................................................... F16L 11/12
[52] U.S. Cl. ........................... 285/49; 285/226; 285/286; 285/906
[58] Field of Search ............................ 285/49, 149, 236, 285/226, 299, 300, 301, 286, 906; 138/121

[56] References Cited

U.S. PATENT DOCUMENTS

| | | |
|---|---|---|
| 925,317 | 6/1909 | Eldred . |
| 1,133,070 | 3/1915 | Subers . |
| 1,797,151 | 3/1931 | Lord ........................................ 285/226 |
| 2,013,193 | 11/1935 | Stadtfeld . |
| 2,365,181 | 8/1944 | Fentress . |
| 2,516,631 | 2/1950 | Jacobson . |
| 2,582,249 | 1/1952 | Hendel . |
| 2,609,002 | 4/1952 | Meissner . |
| 2,666,657 | 2/1954 | Howard et al. . |
| 2,841,183 | 6/1958 | Rejeski . |
| 2,867,242 | 2/1959 | Harris et al. . |
| 2,987,329 | 6/1961 | Borton ..................................... 285/149 |
| 3,086,556 | 4/1963 | Kanter . |
| 3,135,295 | 6/1964 | Ziebold . |
| 3,169,785 | 2/1965 | Ziebold . |
| 3,273,916 | 9/1966 | Tillery . |
| 3,299,417 | 1/1967 | Sibthorpe . |
| 3,549,176 | 12/1970 | Contretas . |
| 3,600,009 | 8/1971 | Shupper . |
| 3,623,513 | 11/1971 | Dinkelkamp . |
| 3,627,354 | 12/1971 | Toepper ............................... 285/226 X |
| 3,717,718 | 2/1973 | Schmidtchen . |
| 3,740,930 | 6/1973 | Cullom . |
| 3,841,207 | 10/1974 | Piot . |
| 3,948,295 | 4/1976 | Lemont et al. . |
| 3,970,334 | 7/1976 | Campbell . |
| 4,121,623 | 10/1978 | Rhone . |
| 4,147,185 | 4/1979 | Hines . |
| 4,186,779 | 2/1980 | Wagner .................................... 138/121 |
| 4,220,181 | 9/1980 | Nyssen . |
| 4,259,990 | 4/1981 | Rohner . |
| 4,262,162 | 4/1981 | Plinke et al. . |
| 4,303,105 | 12/1981 | Rohner . |
| 4,306,491 | 12/1981 | Reardon, Jr. . |
| 4,377,188 | 3/1983 | Stiegart . |
| 4,458,722 | 7/1984 | Dahn . |
| 4,481,978 | 11/1984 | Escandell . |

(List continued on next page.)

FOREIGN PATENT DOCUMENTS

| | | | |
|---|---|---|---|
| 565466 | 10/1993 | European Pat. Off. ............... | 285/226 |
| 785210 | 8/1935 | France .................................... | 285/236 |
| 2324866 | 4/1977 | France .................................... | 285/226 |
| 70340 | 11/1992 | Germany . | |
| 292551 | 11/1953 | Switzerland . | |
| 2278901 | 12/1994 | United Kingdom ..................... | 285/49 |

*Primary Examiner*—Dave W. Arola
*Attorney, Agent, or Firm*—Litman, McMahon & Brown LLC

[57] ABSTRACT

A heat and vibration resistant flexible metal hose assembly includes a liner with either spiral or annular corrugations, a medial body section, first and second end sections and first and second tapered, transition sections converging from the body section to the end sections. The corrugations have diameters in the transition sections which decrease from the body section to the end sections. An optional sleeve subassembly receives the liner and comprises a braided woven wire fabric sleeve secured in place on the liner by first and second annular collars welded on sleeve and liner end sections. Vibration is effectively damped by reducing resonance of the piping assembly by covering the liner with the sleeve with contact therebetween, and by providing the tapered transition sections for effectively transmitting vibrational forces from each end to the greater-diameter liner center section. The liner, sleeve and collars are secured together in a thermally conductive relationship for dissipation of heat throughout the hose assembly.

11 Claims, 7 Drawing Sheets

U.S. PATENT DOCUMENTS

| | | |
|---|---|---|
| 4,846,147 | 7/1989 | Townsend et al. . |
| 4,854,416 | 8/1989 | Lalikos et al. . |
| 4,867,269 | 9/1989 | Lalikos et al. . |
| 5,020,512 | 6/1991 | Vago et al. . |
| 5,042,172 | 8/1991 | Foco et al. . |
| 5,228,479 | 7/1993 | Thomas . |
| 5,259,418 | 11/1993 | Hamrick . |
| 5,316,047 | 5/1994 | Kanao . |
| 5,393,260 | 2/1995 | Barth . |
| 5,639,127 | 6/1997 | Davey ........................................ 285/49 |

HEAT AND VIBRATION RESISTANT FLEXIBLE METAL HOSE ASSEMBLY

BACKGROUND OF THE INVENTION

1. Field of the Invention

The present invention relates generally to flexible piping, and in particular to flexible metal piping with heat and vibration resistant characteristics.

2. Description of the Related Art

Flexible metal piping is widely used in a variety of applications and has been produced in a number of different configurations to provide desired operating characteristics. For example, exhaust systems often require flexible metal piping for interconnecting different exhaust system components. Such flexible piping has the advantage of being readily adaptable for different spacings and orientations of components since its flexibility permits bending into desired configurations. Furthermore, vibration of one or more components connected to the flexible metal piping, for example, engine vibration, can be dampened by the flexible piping. Moreover, heat from an exhaust system can be conducted by flexible metal piping components and dissipated. Still further, the flexibility of such metal piping can be effective for accommodating thermal expansion and contraction associated with gas systems, such as systems for handling exhaust and other high pressure, high temperature gases.

Flexible metal piping can be formed in a variety of ways, including spiral-winding flat metal bands and interlocking the leading and trailing edges thereof. Flexible metal piping can also be formed from cylindrical metal stock by hydraulically forming corrugations therein with either annular or spiral (helical) configurations.

By providing corrugations in the flexible metal piping relatively large surface areas can be provided for enhancing heat distribution. Moreover, the corrugated flexible metal piping can effectively dissipate vibrational energy. Prior art examples of corrugated flexible metal piping include the bellows expansion unit shown in the Ziebold U.S. Pat. No. 3,169,785. The Ziebold '785 patent also teaches providing tapered corrugation sections wherein the corrugations have diminishing diameters for purposes of transferring energy to a section with constant diameter corrugations whereat the energy can be more effectively dissipated.

Another type of bellows connector piping is shown in the Contreras U.S. Pat. No. 3,549,176. The piping shown therein includes a woven wire braid liner positioned inside of a corrugated bellows.

However, heretofore there has not been available a heat and vibration resistant flexible metal hose assembly with the advantages and features of the present invention.

SUMMARY OF THE INVENTION

In the practice of the present invention, a flexible heat and vibration resistant hose assembly is provided which includes a liner with either annular or spiral corrugations forming body and first and second transition sections thereof. The body section has relatively constant-diameter corrugations and the transition sections have multiple corrugations which decrease in diameter as the transition sections converge towards liner end sections. A sleeve subassembly includes a sleeve with a passage which receives the liner in contact therewith. The sleeve comprises braided or woven wire which is formed over the liner to provide a body section, end sections and tapered transition sections. The sleeve subassembly also includes a pair of collars which are placed over the liner and sleeve end sections. The collars are secured to the end sections, for example by welding, whereby the liner, sleeve and collars are thermally linked in a heat-conductive relationship. The tapered transition sections of the liner and the sleeve cooperate with the welded connections to transfer heat and vibrational energy from connections at each end of the piping assembly to the body sections of the piping assembly for damping, dissipation and resistance.

OBJECTS AND ADVANTAGES OF THE INVENTION

The principle objects and advantages of the present invention include: providing a flexible metal hose assembly; providing such a hose assembly which includes a corrugated liner; providing such a hose assembly which includes a braided or woven-wire sleeve placed over the liner; providing such a hose assembly with components which are connected in a thermally-conductive relationship; providing such a hose assembly which is effective for heat dissipation; providing such a hose assembly which is effective for vibration dampening; providing such a hose assembly which includes a liner with tapered transition sections; providing such a hose assembly wherein the transition sections tend to transmit vibrations from ends of the hose assembly to middle portions thereof; providing such a hose assembly wherein the sleeve is secured on the liner by clamps on the ends thereof; providing such a hose assembly which is particularly well suited for high temperature applications involving vibration, such as exhaust system applications; and providing such a hose assembly which is economical to manufacture, efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
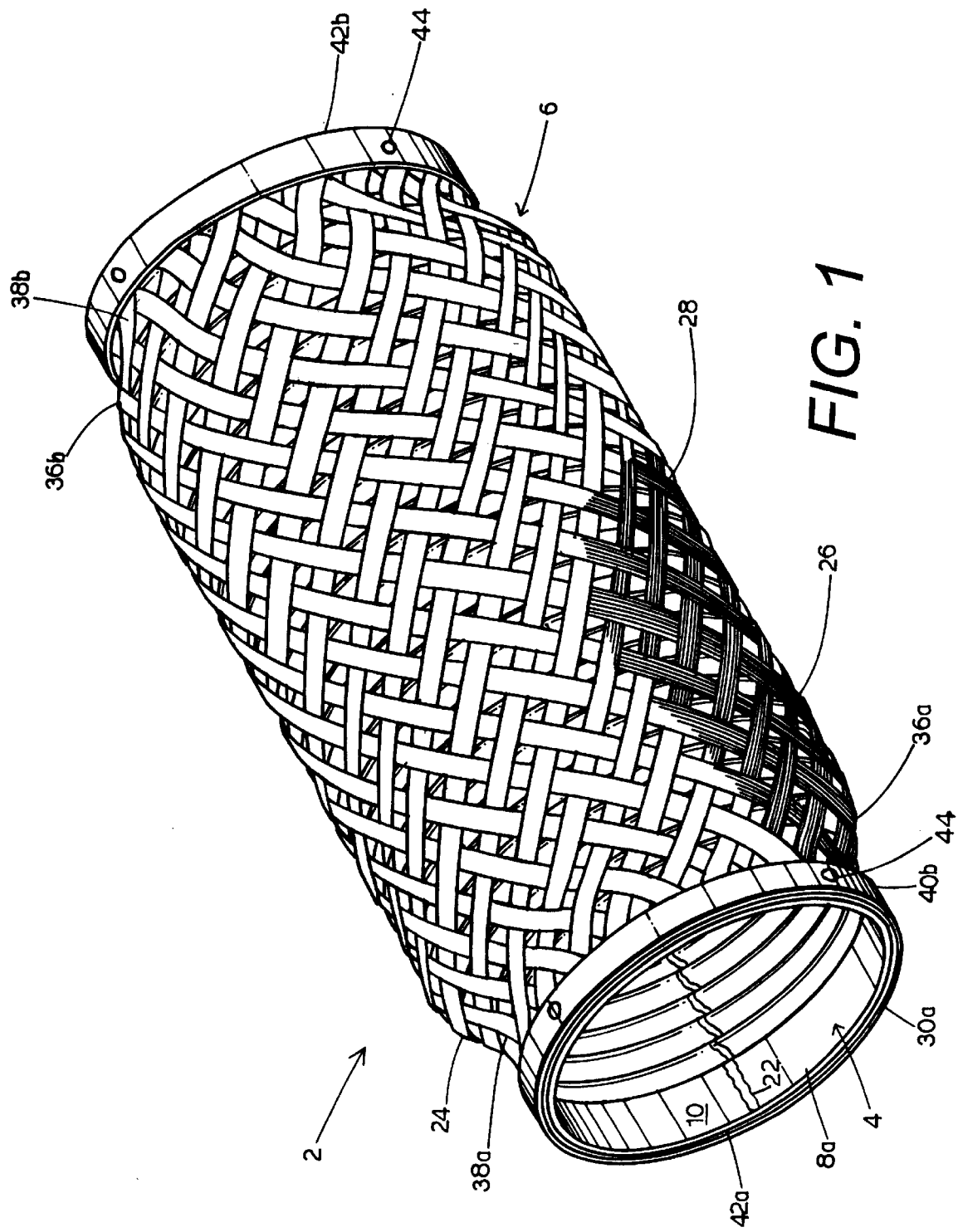
FIG. 1 is a perspective view of a heat and vibration resistant flexible metal hose assembly embodying the present invention.
Figure 2:
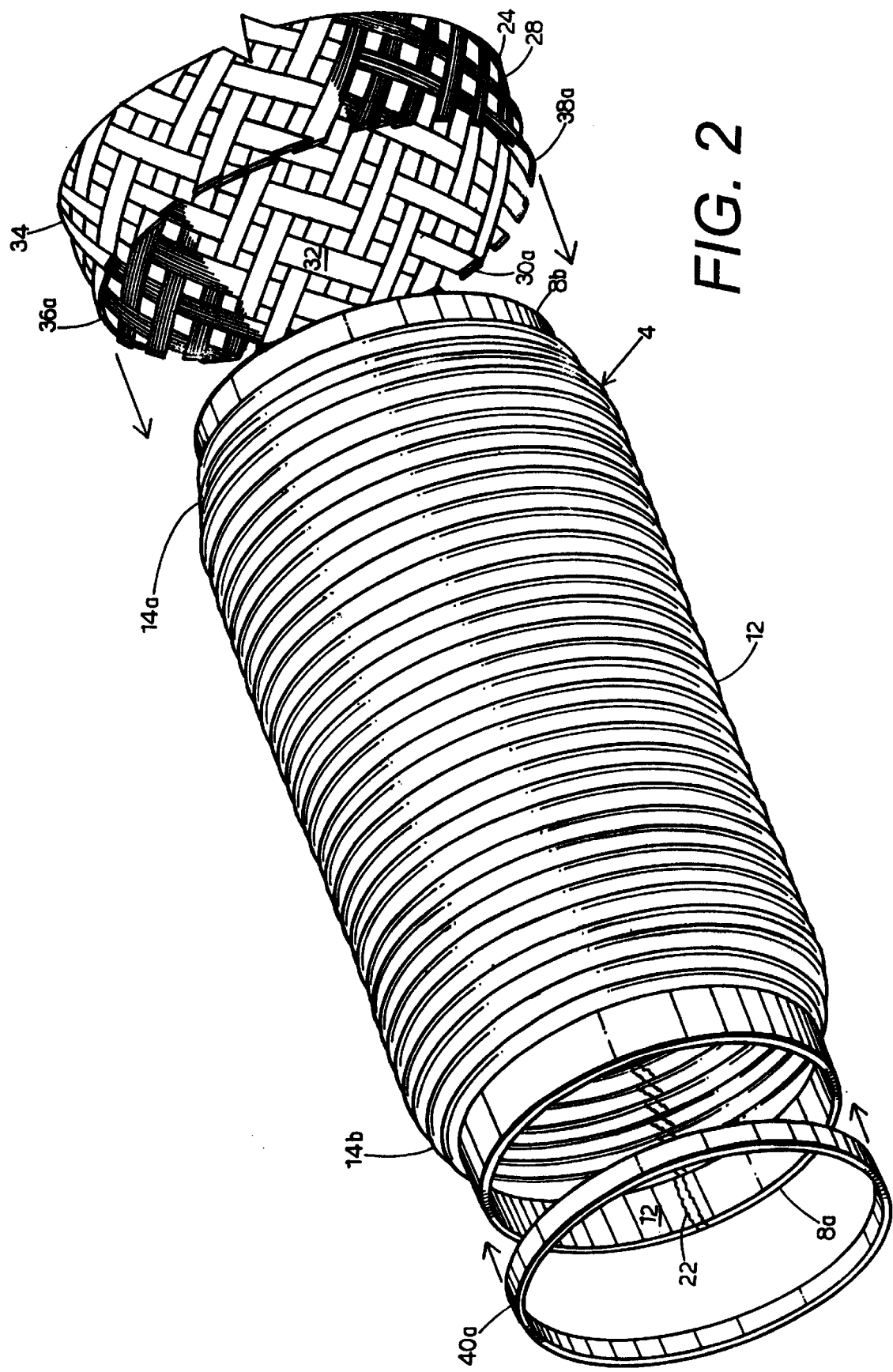
FIG. 2 is an exploded perspective view of the hose assembly.
Figure 3:
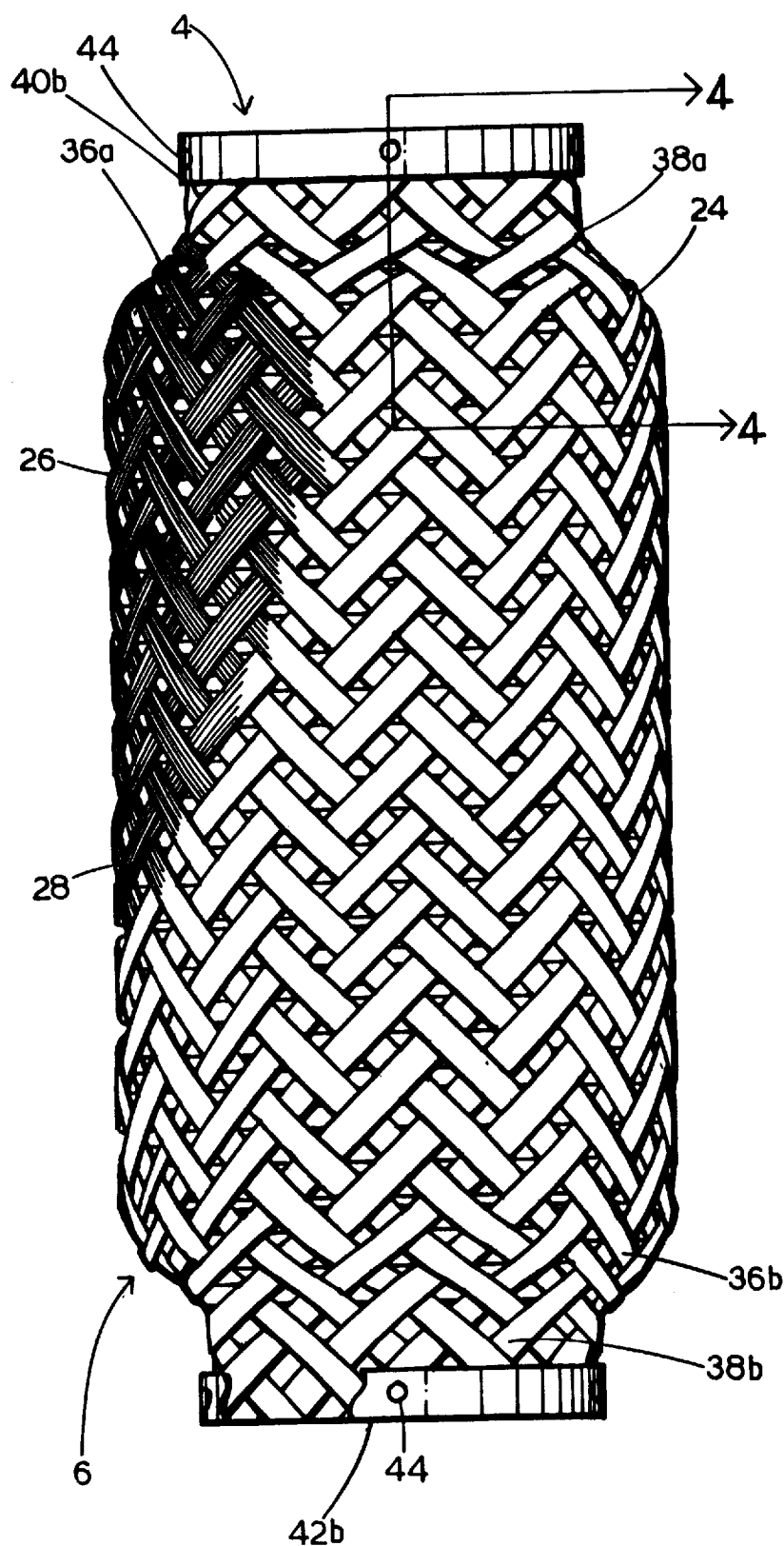
FIG. 3 is a side elevational view of the hose assembly.
Figure 4:
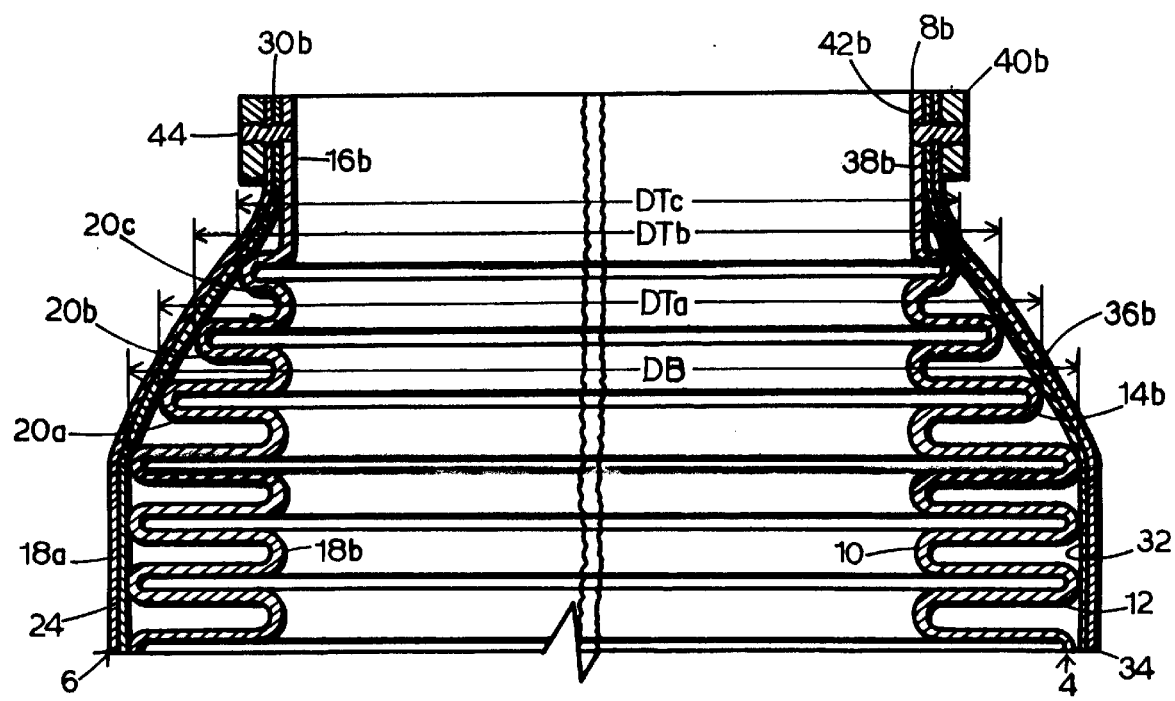
FIG. 4 an enlarged large, fragmentary, cross-sectional view of the hose assembly taken generally along line 4—4 in FIG. 3.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a heat and vibration resistant flexible metal hose assembly embodying the present invention. The hose assembly 2 generally comprises a corrugated flexible metal liner 4 and a braided woven wire sleeve subassembly 6.

II. Liner 4

The liner 4 includes first and second ends 8a, 8b and a bore 10 extending therebetween and open thereat. The liner 4 also includes a medial corrugated body section 12, first and second tapered, corrugated transition sections 14a, 14b, and first and second generally annular, cylindrical, end sections 16a, 16b with substantially continuous diameters and smooth walls.

The liner 4 includes a plurality of juxtaposed, generally annular corrugations 18 forming alternating lands and grooves 18a, 18b respectively. The body corrugation lands 18a have substantially constant diameters DB. The transition sections 14a, 14b have tapering corrugations 20a, 20b, 2c with land diameters DT. 1, DT.2, DT.3 which progressively decrease from the body section 12 to the respective end sections 16a, 16,b, whereby the liner transition sections 14a, 14b taper inwardly and converge from the body section 12 to the end sections 16a, 16b.

The liner 4 can be formed in any suitable manner, such as forming a cylinder from flat strip stock in a tube mill wherein the strip edges are butt welded at a longitudinal weld seam 22. The corrugation s 18 can then be formed in a hydraulic forming machine or in some other suitable manner.

III. Sleeve Subassembly 6

The sleeve subassembly 6 includes a braided woven-wire sleeve 24 with multiple wire strands 26 forming wire bands 28 which are woven to form a flexible, fabric-type configuration. The sleeve 24 includes opposite first and second ends 30a, 30b and a sleeve passage 32 extending between and open at the sleeve ends 30a, 30b. The sleeve ends 30a, 30b are located generally in proximity to the liner ends 8a, 8b. The sleeve 24 can include a constant-diameter body section 34, a pair of first and second tapered transition sections 36a, 36b and a pair of first and second end sections 38a, 38b each located in proximity to a respective sleeve end 30a, 30b. The sleeve sections 34, 36a,b; and 38a,b can generally correspond in diameter to the liner body section 12; the liner transition sections 14a,b; and the liner end sections 16a,b whereby the liner 4 fits relatively tightly within the sleeve passage 32 with relatively continuous engagement therebetween for effective heat transfer and vibration transfer therebetween in operation. The sleeve 24 can be formed with a substantially continuous diameter which is sufficient to telescopically receive the liner 4. With the sleeve 24 thus receiving the liner 4 within its passage 32, the sleeve 24 can be constricted at its ends to form the transition sections 36a,b and the end sections 38a,b. For example, the sleeve 24 can be compressed by hand to form the transition sections 36a,b and the end sections 38a,b. The braided, woven-wire construction of the sleeve 24 facilitates compressing same to form the desired contact between the liner 4 and the sleeve 24 for effective transfer of thermal and vibrational energy therebetween.

The sleeve 24 also functions to resist expansion of the liner 4. Thus, expansion and re-extension forces on the liner 4 which might tend to pull out the corrugations 18 are effectively resisted by the sleeve 24 which absorbs and resists such tensile forces exerted on the hose assembly 2 in operation. By maintaining the corrugations 18 relatively intact, by means of the sleeve 24, they tend to retain their maximum effectiveness in dissipating heat and energy.

A pair of generally annular first and second collars 40a,b are secured over the sleeve end sections 38a,b respectively, thus forming composite, multi-layered first and second mouths 42a,b respectively whereat the collars 40a,b; the sleeve end sections 38a,b; and the liner end sections 16a,b are fixedly interconnected by multiple spot welds 44 located in radially spaced relation around the collars 40a,b.

The spot welds 44 function to fixedly interconnect the respective collars 40a,b; the sleeve 24 and the liner 4. The relatively fixed interconnection of these piping or hose assembly 2 components provides cooperation therebetween in facilitating the resistance of the piping assembly 2 to heat and vibration. More specifically, vibrations tend to be damped by several characteristics of the piping assembly 2 components. The hose assembly mouths 42a,b can be connected to a source of exhaust gas, such as the exhaust system of an internal combustion engine or some other exhaust gas source, and to an exhaust pipe, muffler or some other downstream outlet device. In addition to heated exhaust fumes, such sources often produce vibration, particularly in the case of an internal combustion engine. Fixed connections of the mouths 42a,b to other components in an exhaust system facilitate the transfer of heat and vibration to the piping assembly 2 for damping and dissipation.

The tapered liner transition sections *14a,b* are sized and designed to transfer significant amounts of the vibration forces to the liner body section 12 with its larger, constant diameter corrugations 18. Thus, risk of cracking by metal fatigue brought on by vibration is reduced at the relatively critical junctures of the piping assembly mouths 42a,b and the exhaust system components, with such vibrations being transferred through the tapered transition sections 14a,b to the body section 12 whereat the vibrations tend to be damped by the constant-diameter, larger corrugations 18 present thereat.

Still further, the sleeve 24 facilitates vibration damping by absorbing significant amounts of vibration energy throughout its entire length. The sleeve 24 tends to have relatively little resonant response due to the relatively large number of individual wire strands 26 which are woven together in wire bands 28. Such a braided, fabric-like woven configuration tends to be relatively ineffective at transmitting vibration, but its mass tends to absorb and damp vibration throughout a wide range of frequencies which are likely to encountered in an exhaust system. Thus, considerable amounts of vibration energy are dissipated in the sleeve 24. Vibration damping characteristics of the hose assembly 2 are further enhanced by the considerable difference in the vibratory characteristics of the liner 4 and the sleeve 24. The sleeve 24, having a woven wire configuration, effectively dampens vibration and is less susceptible to resonant vibration than other, more rigid, homogenous structures. Thus, resonant vibrating characteristics of the liner 4 tend to be dissipated by the sleeve 24.

Figure 5:
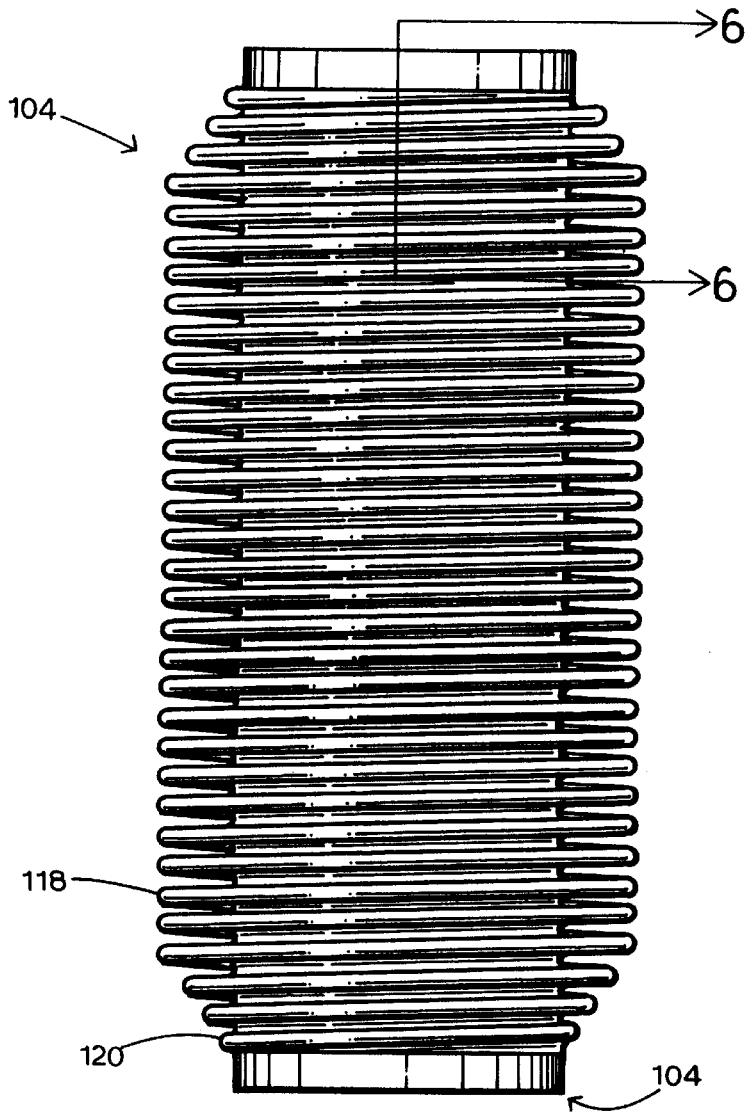
FIG. 5 is a side elevational view of a spiral-wound, corrugated liner for a hose assembly comprising a first alternative embodiment of the present invention.

The substantial interconnection of the thermally conductive liner 4, sleeve 24 and collars 40a,b, facilitate heat dissipation, particularly since their respective configurations present considerable surface area for heat dissipation by convection and radiation. The sleeve subassembly 4 is optional and can be eliminated whereby the liner 4 would function somewhat to resist heat and vibration in a similar manner to the combined liner 4 and sleeve subassembly 6, e.g., a liner 104 as shown in FIG. 5.

IV. First Alternative Embodiment Hose Assembly 102

Figure 6:
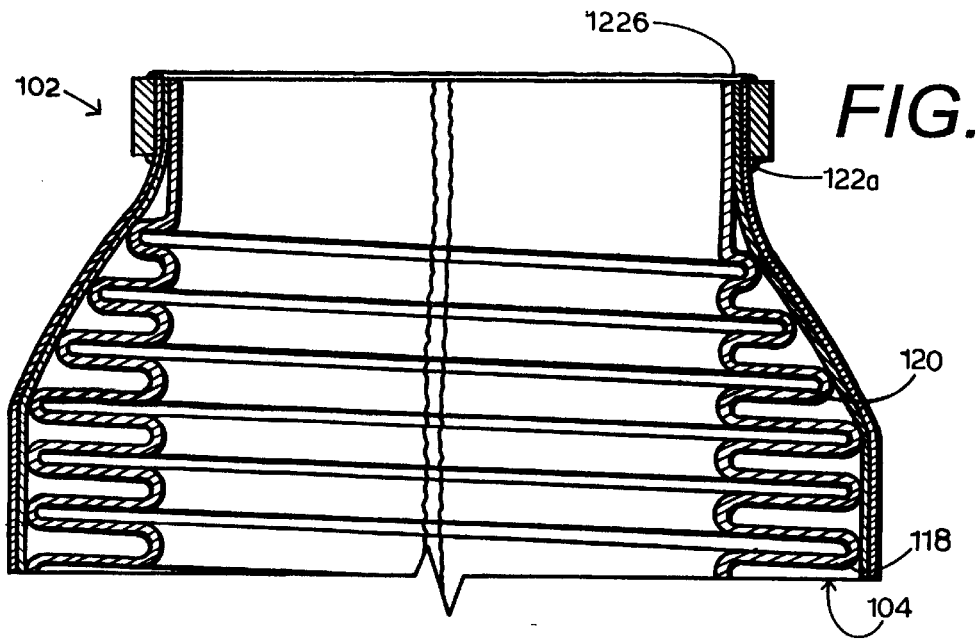
FIG. 6 is an enlarged, fragmentary, cross-sectional view of the first alternative embodiment hose invention taken generally along line 6—6 in FIG. 5 and including a sleeve and a collar.

A first alternative embodiment hose assembly 102 (FIGS. 5 and 6) includes a liner 104 with a configuration substantially similar to the liner 4 described above, except with spiral-wound corrugations 118, 120 forming a body section 112 and first and second transition sections 114a,b.

A collar 124 is fastened on each piping assembly end 126 by inner and outer annular collar welds 122a,b which interconnect the liner 104, a sleeve 106 and the collars 124 in a vibration-resistant and heat-resistant relationship. The modified embodiment piping assembly 102 thus functions in a substantially similar manner to the previously described piping assembly 2 whereby vibration forces are dampened and heat is dissipated by the cooperation of the modified piping assembly 102 components.

V. Second Alternative Embodiment Hose Assembly 202

Figure 7:
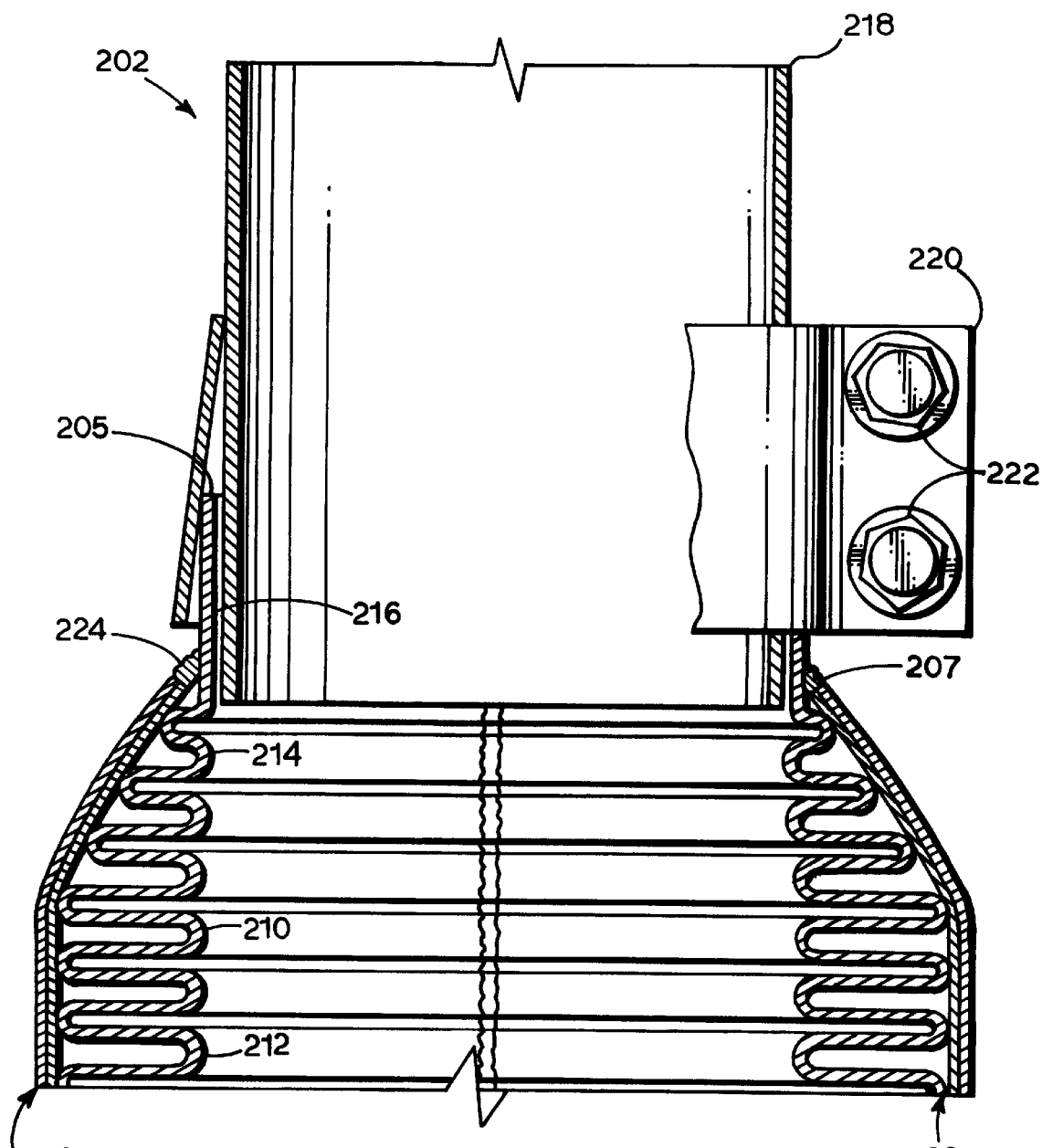
FIG. 7 is a fragmentary, cross-sectional view of a hose assembly comprising a second alternative embodiment of the present invention.

A heat and vibration resistant hose assembly 202 comprising a second alternative embodiment of the present invention is shown in FIG. 7 and includes a liner 204 with a body section 212, a transition section 214 and an extended end section 216 with a liner end 205. The body and transition sections 212, 214 are corrugated. The extended end section 216 is generally smooth-walled with a cylindrical configuration. The liner 204 includes a bore 210 which is open at the end section 216 and receives a connecting pipe, such as an exhaust pipe 218 which is telescopically received therein.

A band clamp 220 is provided for clampingly securing the liner end section 216 to the exhaust pipe 218 in a relatively fluid-tight engagement. The band clamp 220 includes a pair of clamp bolts 222 for tightening the band clamp 220 to effect a relatively fluid-tight seal between the liner end section 216 and the exhaust pipe 218. A sleeve subassembly 206 can be provided for receiving the liner 204 and operates in a similar manner to the sleeve subassembly 6 and 106 described above to dampen vibration, resist expansion and re-extension, and to dissipate thermal and vibrational energy. The sleeve subassembly 206 includes an end 207 which can be fixedly secured to the liner end section 216 by an annular weldment 224.

VI. Third Alternative Embodiment Hose Assembly 302

Figure 8:
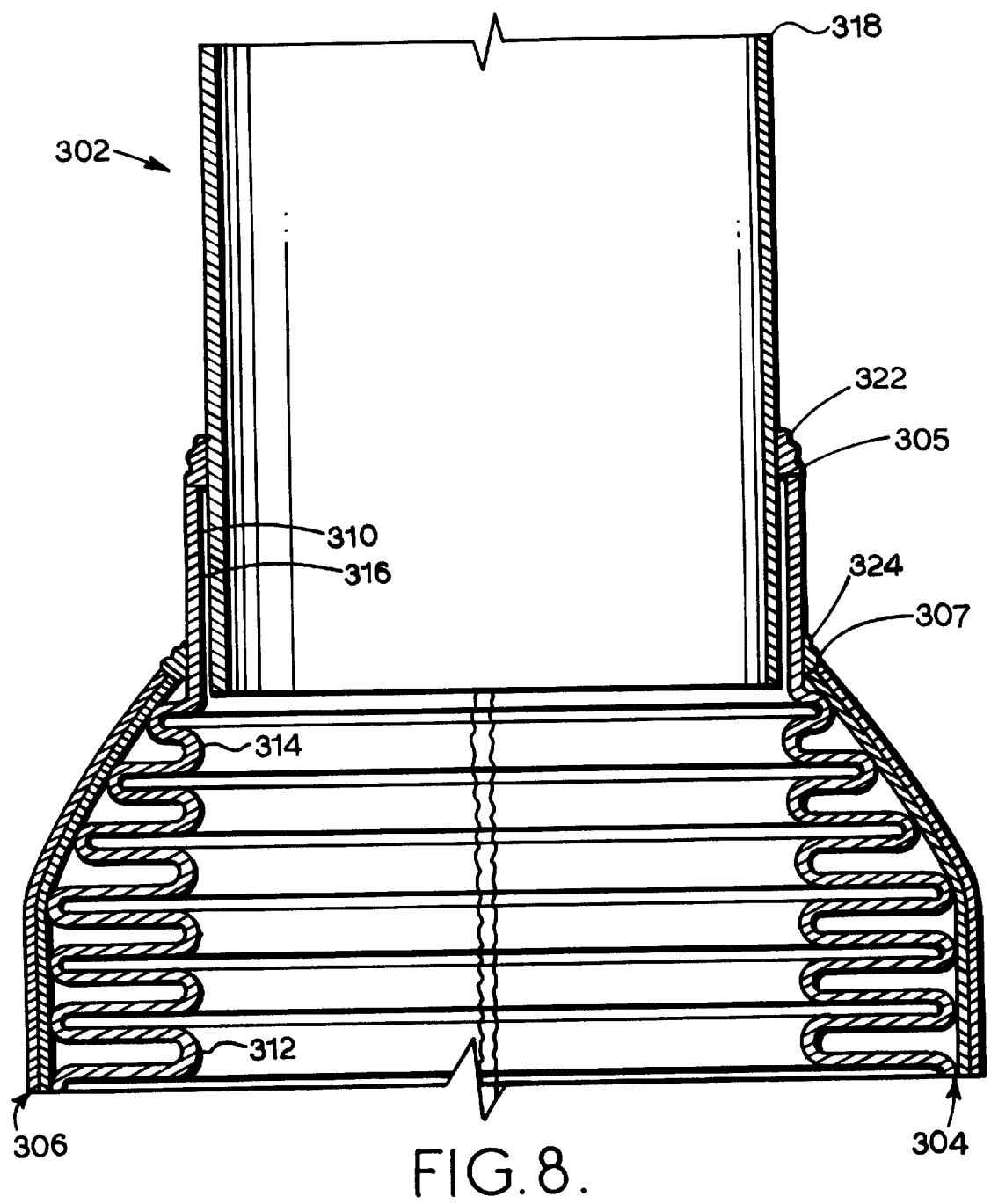
FIG. 8 is a fragmentary, cross-sectional view of a hose assembly comprising a third alternative embodiment of the present invention.

A heat and vibration resistant hose assembly 302 comprising a third alternative embodiment of the present invention is shown in FIG. 8 and includes a liner 304 with a body section 312, a transition section 314 and an extended end section 316. The liner 304 is similar to the previously described liner 204, and includes corrugated body and transition sections 312, 314. The extended end section 316 is generally smooth-walled with a cylindrical configuration. The liner 304 includes a bore 310 which is open at the end section 316 and receives a connecting pipe, such as an exhaust pipe 318, which is telescopically received therein. The liner end section 316 forms a liner end 305. The exhaust pipe 318 is fixedly secured to the liner end section 316 by an annular weldment 322.

An optional sleeve subassembly 306 can be provided for receiving the liner 304 and operates in a similar manner to the sleeve subassemblies 6, 106 and 206 described above to dampen vibration, resist expansion and re-extension, and to dissipate thermal and vibrational energy. The sleeve subassembly 206 can be mounted on the liner 304 by an annular weldment 324 fixedly securing the sleeve subassembly 306 at an end 307 thereof to the liner end section 316.

It is to be understood that while certain forms of the present invention have been illustrated and described herein, it is not to be limited to the specific forms or arrangement of parts described and shown.

What is claimed and desired to be secured by Letters Patent is as follows:

1. A heat and vibration resistant flexible metal hose assembly, which includes:
   (a) a flexible liner having:
      (1) first and second ends;
      (2) a bore having a substantially continuous diameter and extending between said ends and open thereat;
      (3) a corrugated, medial body section;
      (4) first and second transition sections each tapering inwardly and converging in a respective direction away from the body section;
      (5) first and second smooth-wall, constant-diameter end sections each located between a respective liner end and a respective transition section; and
      (6) each said transition section including a plurality of corrugations which progressively decrease in diameter from said body section to a respective end section;
   (b) a sleeve subassembly having:
      (1) first and second ends each located adjacent a respective liner end;
      (2) a sleeve passage extending between and open at said sleeve ends, said sleeve passage receiving said liner;
      (3) a sleeve body section receiving said liner body section;
      (4) first and second sleeve transition sections receiving said liner first and second transition sections respectively;
      (5) first and second sleeve end sections receiving said liner first and second ends respectively;
      (6) said transition sections tapering from said body section to said end sections; and
      (7) said liner comprising a braided material formed by weaving bands of individual wire strands in a generally cylindrical configuration; and
   (c) first and second collars each placed in overlying relation on a respective sleeve end section, each said collar having an annular configuration and being located in proximity to respective sleeve and liner ends;
   (d) first and second weldments each interconnecting a respective collar and respective liner and sleeve end sections; and (e) said sleeve and said collars forming a sleeve subassembly receiving said liner in a vibration and heat exchange relationship therewith.

2. The assembly according to claim 1 wherein said body and transition section corrugations are annular.

3. The assembly according to claim 1 wherein said body and transition section corrugations are helical.

4. The assembly according to claim 1 wherein said liner includes a longitudinal weld seam extending between its ends.

5. The assembly according to claim 1, wherein:

(a) said first and second weldments comprise spot welds.

6. The assembly according to claim 5, which includes:

(a) a plurality of said spot welds interconnecting each collar with a respective liner end section and a respective sleeve end section.

7. The assembly according to claim 1 wherein:

(a) each said weldment comprises an annular weldment.

8. A heat and vibration resistant flexible metal hose assembly for connection to a pipe with an end, which includes:

(a) a flexible liner having:
      (1) first and second ends;
      (2) a bore having a substantially continuous diameter and extending between said ends and open thereat;
      (3) a corrugated, medial body section;
      (4) first and second transition sections each tapering inwardly and converging in a respective direction away from the body section;
      (5) first and second smooth-wall, constant-diameter end sections each located between a respective liner end and a respective transition section; and
      (6) each said transition section including a plurality of corrugations which progressively decrease in diameter from said body section to a respective end section;

(b) a sleeve subassembly having:
      (1) first and second ends each located adjacent a respective liner end;
      (2) a sleeve passage extending between and open at said sleeve ends, said sleeve passage receiving said liner;
      (3) a sleeve body section receiving said liner body section;
      (4) first and second sleeve transition sections receiving said liner first and second transition sections respectively;
      (5) first and second sleeve end sections receiving said liner first and second ends respectively;
      (6) said transition sections tapering from said body section to said end sections; and
      (7) said liner comprising a braided material formed by weaving bands of individual wire strands in a generally cylindrical configuration; and (c) first and second collars each placed in overlying relation on a respective sleeve end section, each said collar having an annular configuration and being located in proximity to respective sleeve and liner ends;

(d) first and second weldments each interconnecting a respective collar and respective liner and sleeve end sections;

(e) said sleeve and said collars forming a sleeve subassembly receiving said liner in a vibration and heat exchange relationship therewith;

(f) at least one of said end sections forming a bore telescopically receiving the pipe end; and (g) connection means for fixedly connecting one of said liner end sections to the sleeve and to the pipe end.

9. The assembly according to claim 8 wherein said connection means comprises a band clamp telescopically receiving said one end section and the pipe end and clamping same together.

10. The assembly according to claim 8 wherein said connection means comprises an annular weldment fixedly welding said one liner end section to the pipe end.

11. The assembly according to claim 8, which includes:

(a) first and second annular weldments fixedly securing said sleeve first and second ends to said liner first and second end sections respectively.

* * * * *